A. VACAREZZA.
OVEN RACK.
APPLICATION FILED JAN. 13, 1920.
1,370,717.
Patented Mar. 8, 1921.
2 SHEETS—SHEET 2.
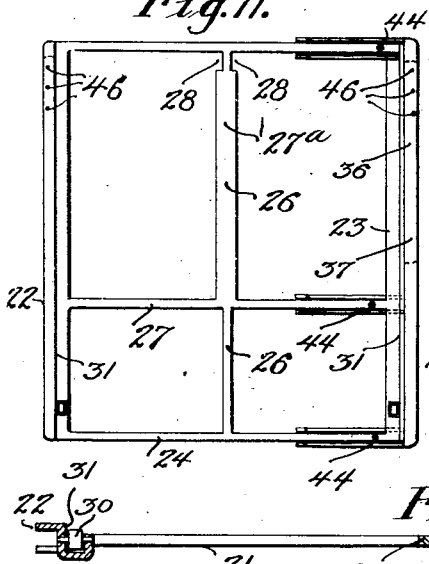
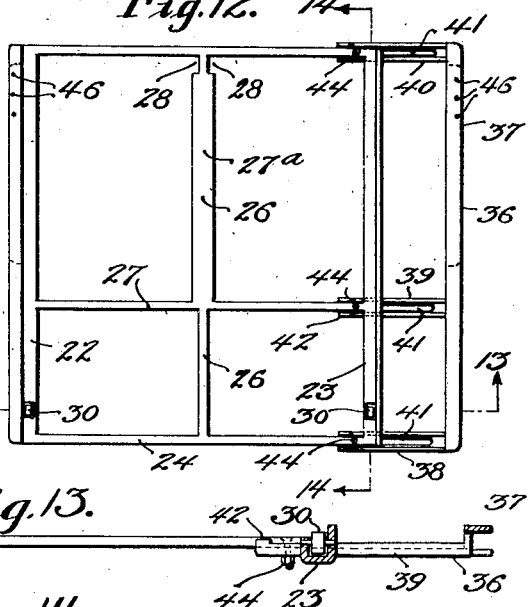
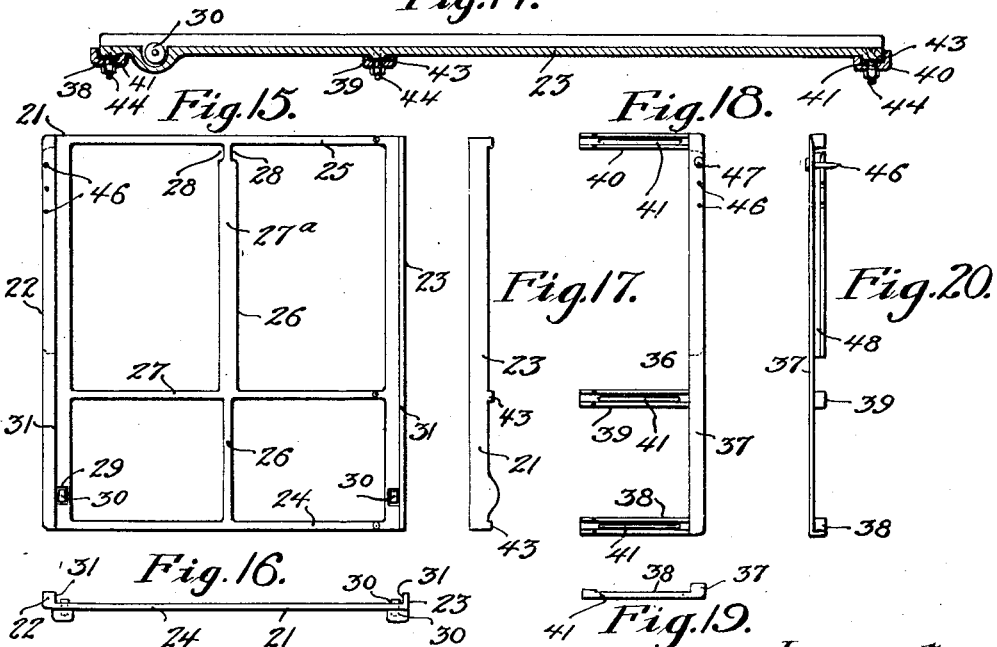
Witnesses
Geo. A. Gruss
Augustus B. Copper
Inventor
Andrew Vacarezza
By Joshua R. H. Potts
his Attorney

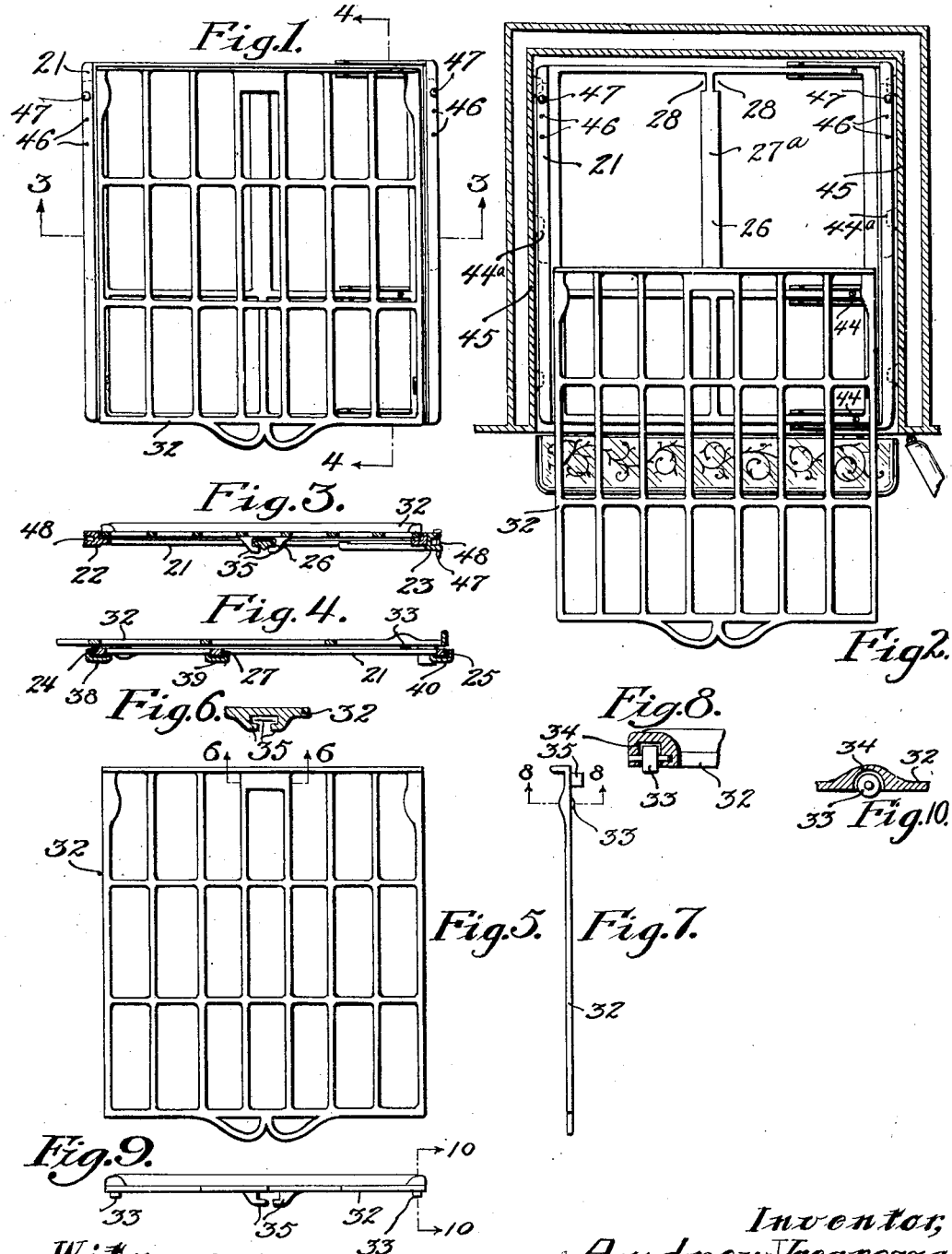

UNITED STATES PATENT OFFICE.

ANDREW VACAREZZA, OF VINELAND, NEW JERSEY.

OVEN-RACK.

1,370,717.  Specification of Letters Patent.  Patented Mar. 8, 1921.

Application filed January 13, 1920. Serial No. 351,090.

*To all whom it may concern:*

Be it known that I, ANDREW VACAREZZA, a citizen of the United States, residing at Vineland, in the county of Cumberland and State of New Jersey, have invented certain new and useful Improvements in Oven-Racks, of which the following is a specification.

One object of my invention is to provide an improved extensible rack which can be used with advantage in the ovens of stoves and ranges and which will permit a cooking utensil or other article to be easily positioned within and removed from an oven and which will also be operative to allow for the thorough inspection of an article being cooked.

Another object is to so construct my invention that one part which is designed to hold the cooking utensil or other article can be easily moved into and out of the oven but will be securely held in position to prevent accidental tilting during its movement.

A further object is to so construct my improved oven rack that the parts can be readily detached for cleaning or other purposes.

A still further object is to so make the device of my invention that it can be easily adjusted to properly fit within ovens of different widths.

These objects, and other advantageous ends which will be described hereinafter, I attain in the following manner, reference being had to the accompanying drawings in which—

Figure 1 is a top plan view of my improved oven rack in a position which it assumes when entirely within an oven, Fig. 2 is a top plan view illustrating my invention in connection with an oven; the oven being shown in section while one of the parts is extended so as to project out of the oven, Fig. 3 is a transverse section taken on the line 3—3 of Fig. 1, Fig. 4 is a longitudinal section taken on the line 4—4 of Fig. 1, Fig. 5 is a top plan view of the extensible shelf which forms a part of my improved rack, Fig. 6 is a fragmentary transverse section taken on the line 6—6 of Fig. 5, Fig. 7 is a side edge view of Fig. 5, Fig. 8 is an enlarged transverse fragmentary section taken on the line 8—8 of Fig. 7, Fig. 9 is a front edge view of Fig. 5, Fig. 10 is an enlarged fragmentary section taken on the line 10—10 of Fig. 9, Fig. 11 is a top plan view of a supporting frame which forms a part of my invention and showing the same in its normal position, Fig. 12 is a view similar to Fig. 11 showing a section thereof having been extended so as to fit an oven of greater width than that shown in Fig. 2, Fig. 13 is an enlarged transverse section taken on the line 13—13 of Fig. 12, Fig. 14 is an enlarged longitudinal section taken on the line 14—14 of Fig. 12, Fig. 15 is a top plan view of the supporting frame with the extensible section removed, Fig. 16 is a front edge elevation of Fig. 15, Fig. 17 is a side edge elevation of Fig. 15, Fig. 18 is a top plan view of the extensible section, Fig. 19 is a front edge view of Fig. 18, and Fig. 20 is a side edge view of Fig. 18.

Referring to the drawings, my invention consists of a supporting frame 21 which has side rails 22 and 23, front and rear rails 24 and 25 and a central rail 26 which extends rearwardly from the front rail 24 and intersects a transversely extending rail 27. The central rail 26 from the transverse rail 27, rearwardly, is T-shape in cross section throughout its length with the exception that immediately in front of the rear rail 25, the head portion 27ª is cut away at 28, as clearly shown in Figs. 2, 11 and 15. The side rails 22 and 23 adjacent the front rail 24 have recesses 27 which form housings for rollers 30.

Ledges 31 are provided at the tops of the side rails 22 and 23 to provide a guideway for a shelf 32; the construction of said shelf being clearly shown in Figs. 5 to 10 inclusive. The shelf 32 is adapted to slide between the ledges 31 of the frame 21 and at its rear has rollers 33 housed within cavities 34 which extend upwardly from the bottom as clearly shown in Figs. 8 and 10. These rollers are adapted to run against the side rails 22 and 23 of the frame 21. The shelf 32 adjacent its rear has two fingers 35 which are adapted to span the side edges of the head 27ª of the central rail 26 so that during the outward movement of the shelf, the latter will not tilt. However, when the shelf is moved into its extreme rear position, these spanning fingers 35 will be positioned directly below the cut-out portions 28 of the head 27ª and the shelf can be bodily lifted from the frame 21. The shelf 32 can be moved forwardly until the spanning fingers 35 strike the transverse rail 27. This limits the forward movement of the shelf as shown in Fig. 2.

The frame 21 has an extensible section 36; said section including a longitudinally extending rail 37 and transversely extending channels 38, 39 and 40. Each of these channels has an elongated slot 41 therein and at their outer ends are provided with lips 42. The bottom of the side rail 23 of the frame 21 has transversely extending lugs 43 which fit within the respective channels, and bolts 44 extend through the frame 21 and through the respective slots 41 in the channels 38, 39 and 40. By this means the channels are adjustably secured to the frame 21 and the extensible section 36 can be moved laterally to vary the distance between the rail 37 and the rail 22. The rails 22 and 37 are adapted to be mounted on side extensions 44ª at the sides of the oven 45 and these rails are preferably provided with holes 46 spaced apart through which a pin 47 can be inserted to permit the frame 21 to be moved outwardly a predetermined distance if desired. The side edges of the rails 22 and 37 are grooved as shown at 48 to span the extensions 44ª in the oven so as to prevent accidental tilting of the frame 21.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An oven rack including a shelf; a frame providing a supporting slideway for said shelf, said frame including an adjustable section having a longitudinally extending rail whereby said latter rail and the oppositely disposed side of the frame provides means of connection to the side walls of an oven, said section including channels, the other portion of the frame having lugs depending from its bottom, the side walls of said channels embracing said lugs but not projecting above the top of said frame, and means for adjustably securing said channels to said other portion of the frame; substantially as described.

2. A shelf having oppositely disposed fingers thereon; and a frame forming a slidable support for said shelf and including a rail T-shape in cross section so as to provide a longitudinally extending head around the edges of which said fingers are adapted to extend, said head being cut away adjacent its rear to permit said fingers to be bodily lifted from said frame, said frame including a transversely extending rail intersecting said central rail at the front of its head; substantially as described.

In testimony whereof I have signed my name to this specification in the presence of two subscribing witnesses.

ANDREW VACAREZZA.

Witnesses:
ANNA RENTON,
CHAS. E. POTTS.